(12) United States Patent
Learn et al.

(10) Patent No.: US 11,504,801 B2
(45) Date of Patent: Nov. 22, 2022

(54) BIMETALLIC JOINING WITH POWDERED METAL FILLERS

(71) Applicant: Phoenix Laser Solutions, Meadville, PA (US)

(72) Inventors: Christopher Learn, Meadville, PA (US); Albert Hammeke, Tolland, CT (US)

(73) Assignee: Phoenix Laser Solutions, Meadville, PA (US)

( * ) Notice: Subject to any disclaimer, the term of this patent is extended or adjusted under 35 U.S.C. 154(b) by 274 days.

(21) Appl. No.: 16/551,284

(22) Filed: Aug. 26, 2019

(65) Prior Publication Data

US 2020/0061736 A1    Feb. 27, 2020

Related U.S. Application Data

(60) Provisional application No. 62/722,621, filed on Aug. 24, 2018.

(51) Int. Cl.

| | |
|---|---|
| *B23K 25/00* | (2006.01) |
| *B23K 26/03* | (2006.01) |
| *B23K 35/00* | (2006.01) |
| *B23K 35/02* | (2006.01) |
| *B23K 26/20* | (2014.01) |
| *B23K 26/22* | (2006.01) |
| *B23K 103/12* | (2006.01) |
| *B23K 103/04* | (2006.01) |
| *B23K 103/22* | (2006.01) |

(52) U.S. Cl.
CPC ............ *B23K 25/00* (2013.01); *B23K 26/034* (2013.01); *B23K 26/20* (2013.01); *B23K 26/22* (2013.01); *B23K 35/004* (2013.01); *B23K 35/007* (2013.01); *B23K 35/0244* (2013.01); *B23K 2103/04* (2018.08); *B23K 2103/12* (2018.08); *B23K 2103/22* (2018.08)

(58) Field of Classification Search
None
See application file for complete search history.

(56) References Cited

U.S. PATENT DOCUMENTS 4,603,089 A * 7/1986 Bampton ............... B21D 47/00
219/121.61
5,398,752 A * 3/1995 Abbott ..................... F28F 1/22
165/171

(Continued)

*Primary Examiner* — Devang R Patel
(74) *Attorney, Agent, or Firm* — Jonathan M. D'Silva; MMI Intellectual Property

(57) ABSTRACT

A method of attaching a first metal object to a second metal object is presented. The first metal object and the second metal object are dissimilar materials. The first metal object comprises an upper surface and a lower surface. The method comprises: positioning the first metal object in intimate contact with the second metal object such that the second metal object is in contact with the lower surface of the first metal object; identifying at least one attachment location on the upper surface of the first metal object where the first metal object is in intimate contact with the second metal object; adding a powdered metal on the upper surface of the first metal object at the at least one attachment location; and firing a heat source at the powdered metal to melt the powdered metal and drive the melted powdered metal through the first metal object and into the second metal object.

13 Claims, 2 Drawing Sheets

(56) References Cited

U.S. PATENT DOCUMENTS

| | | | | | |
|---|---|---|---|---|---|
| 5,635,306 | A | * | 6/1997 | Minamida | B21D 47/00 428/593 |
| 5,837,960 | A | * | 11/1998 | Lewis | B29C 64/153 219/121.63 |
| 5,964,963 | A | * | 10/1999 | Turchan | B23K 35/24 228/262.9 |
| 6,479,168 | B2 | * | 11/2002 | Mazumder | B23K 26/32 428/659 |
| 7,820,939 | B2 | * | 10/2010 | Mazumder | B23K 26/32 219/121.64 |
| 8,296,948 | B2 | * | 10/2012 | Lesage | F28F 9/165 29/890.044 |
| 2004/0074882 | A1 | * | 4/2004 | Speranza | F16B 5/07 219/121.64 |
| 2011/0139753 | A1 | * | 6/2011 | Lee | B23K 26/244 219/121.64 |
| 2014/0263191 | A1 | * | 9/2014 | Zapata | B23K 9/164 219/74 |
| 2016/0318130 | A1 | * | 11/2016 | Stempfer | B22F 12/00 |
| 2016/0325370 | A1 | * | 11/2016 | Prociw | B23K 35/3006 |
| 2018/0029163 | A1 | * | 2/2018 | Capostagno | B23K 26/082 |
| 2019/0160576 | A1 | * | 5/2019 | Fujiya | F01D 5/025 |

* cited by examiner

BIMETALLIC JOINING WITH POWDERED METAL FILLERS

BACKGROUND

In the manufacturing of industrial components, there is a need to join two metallic structures together by welding or similar fusion. When the structures are of the same type of metal it is easier to weld them together than if they are composed of two different types of metals. It is particularly difficult to weld dissimilar metals together because of the different melting points and reflectivity of the two metals. These difficulties are present in the manufacture of industrial heat exchangers where copper waveforms are required to be welded to a stainless steel under laminate sheet. Various attempt in the prior art have been put forward to weld dissimilar materials of this type together. What is presented is an improved method of welding dissimilar materials.

SUMMARY

What is presented is a method of attaching a first metal object to a second metal object, wherein the first metal object and the second metal object are dissimilar materials and the first metal object comprises an upper surface and a lower surface. The method comprises first positioning the first metal object in intimate contact with the second metal object such that the second metal object is in contact with the lower surface of the first metal object. Then identifying at least one attachment location on the upper surface of the first metal object where the first metal object is in intimate contact with the second metal object. Next adding a powdered metal on the upper surface of the first metal object at the at least one attachment location. And, finally, firing a heat source at the powdered metal to melt the powdered metal and drive the melted powdered metal through the first metal object and into the second metal object.

In various embodiments, the first metal object has a higher reflectivity than the second metal object. In some embodiments, the first metal object is copper that may be a waveform. The second metal object may be stainless steel that may be an under laminate sheet. The powdered metal may be stainless steel.

In various embodiments, powdered metal is delivered off axis relative to the heat source or delivered coaxially relative to the heat source. A camera or temperature sensor may be incorporated to monitor any of temperature, weld penetration, and failure conditions.

The heat source could comprise a dual spot weld with two laser beams slightly offset from each other fired either simultaneously or at different time intervals. The heat source could also comprise a laser scanner or wobble head to stir the melted powdered metal.

The heat source may be interfaced with a robot that provides motion control of the laser. The heat source may be any one of a laser welder operated in pulse mode, a laser welder operated in continuous wave mode, a resistance welder, a tungsten inert gas welder, a metal inert gas welder, an ultrasonic welder, a friction welder, and an X-ray welder.

Those skilled in the art will realize that this invention is capable of embodiments that are different from those shown and that details of the devices and methods can be changed in various manners without departing from the scope of this invention. Accordingly, the drawings and descriptions are to be regarded as including such equivalent embodiments as do not depart from the spirit and scope of this invention.

BRIEF DESCRIPTION OF DRAWINGS

For a more complete understanding and appreciation of this invention, and its many advantages, reference will be made to the following detailed description taken in conjunction with the accompanying drawings.

DETAILED DESCRIPTION

Figure 1:
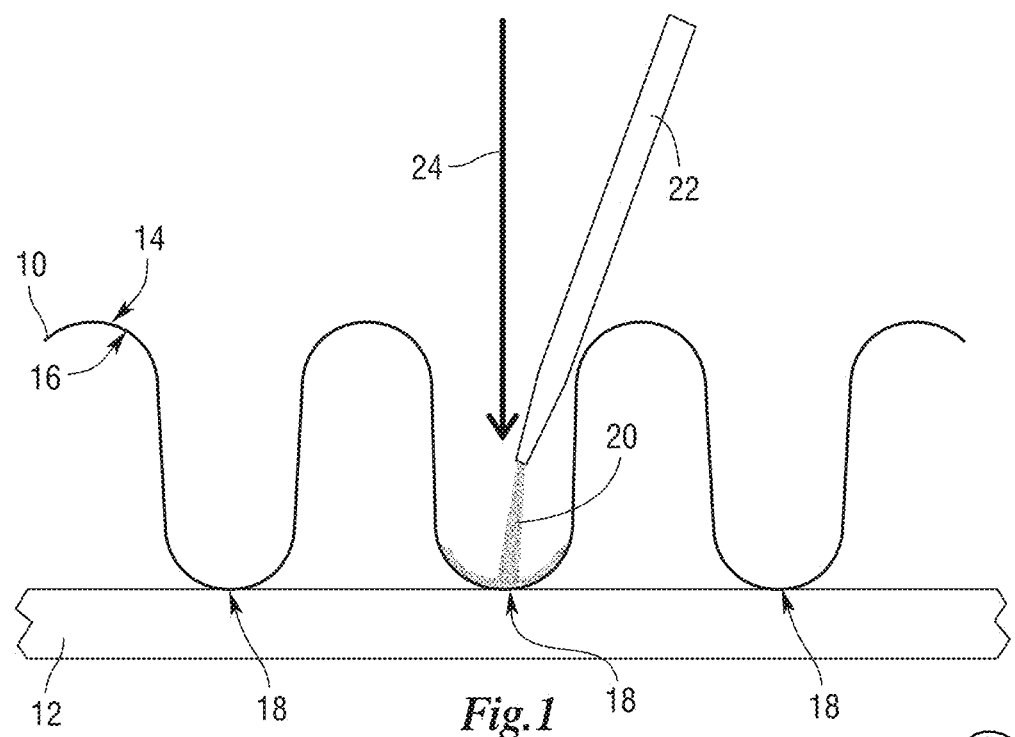
FIG. 1 is a cross sectional representation of the method of joining a copper waveform to a stainless-steel under laminate sheet with a laser directed towards a powdered metal stream.

Referring to the drawings, variations of corresponding parts in form or function that are depicted in the figures are described. It will be understood that variations in the embodiments can generally be interchanged without deviating from the invention.

The problem of joining bimetallic structure must be addressed in a variety of industrial applications. There is a need to form metallurgical bonds and fusions between similar or dissimilar bimetallic structures reliably and repeatedly. In the prior art, joining processes such as laser welding is difficult and can be unreliable when welding highly reflective or conductive materials such as copper alloys, particularly in production environments.

A good example of an industrial application that joins bimetallic structures is the joining/welding of bimetallic stainless-steel under laminate sheets to a copper waveform for heat exchanger panels. The disclosure presented allows for a metallurgical bond and fusion between similar or dissimilar bimetallic structures that can also have dissimilar material thicknesses. The joining technique presented produces a strong bond between two or more materials. Both metallurgical and mechanical bonds can be produced. Heat exchanger panels comprise copper waveforms that are face sheets formed from a thin copper sheet shaped into a multi-curve waveform. The copper waveform must be welded to the stainless steel under laminate and requires a strong weld between the two pieces. Welding of bimetallic materials can be difficult and the copper to stainless steel combination offers a metallurgical challenge. The vast differences in melting temperatures of the two alloys make forming a true metallurgical bond challenging.

Using industry standard prior art autogenous laser welding techniques (i.e. welding done either without solder or with a filler of the same metal as the pieces being welded) has not been able to yield a weld interface between these bimetallic sheets. The copper waveform requires a very high laser power density to overcome the high reflectivity and conductivity of copper to the laser energy on the surface of the metal. The total laser energy/power density to melt the copper waveform to produce a weld joint is highly sensitive, not reproducible, and unreliable. Experiments yielded either excessive heat or over melting of the copper waveform or non-wetting of the copper waveform. Also, the copper waveform has a very small area of attachment to the stainless steel under laminate and over melting of the copper waveform caused holes and leaks in the heat exchanger. Further manufacturing challenges that face the prior art industry standard practices and provide unreliable and unacceptable results include: joining a thin bimetallic copper waveform to a thick stainless-steel under laminate sheet; the tight clearance of the weld location centralized between the trough of the copper waveforms; and the tight tangency of intimate contact between the copper waveforms and the stainless-steel under laminate. The method described herein addresses some of these limitations.

Figure 2:
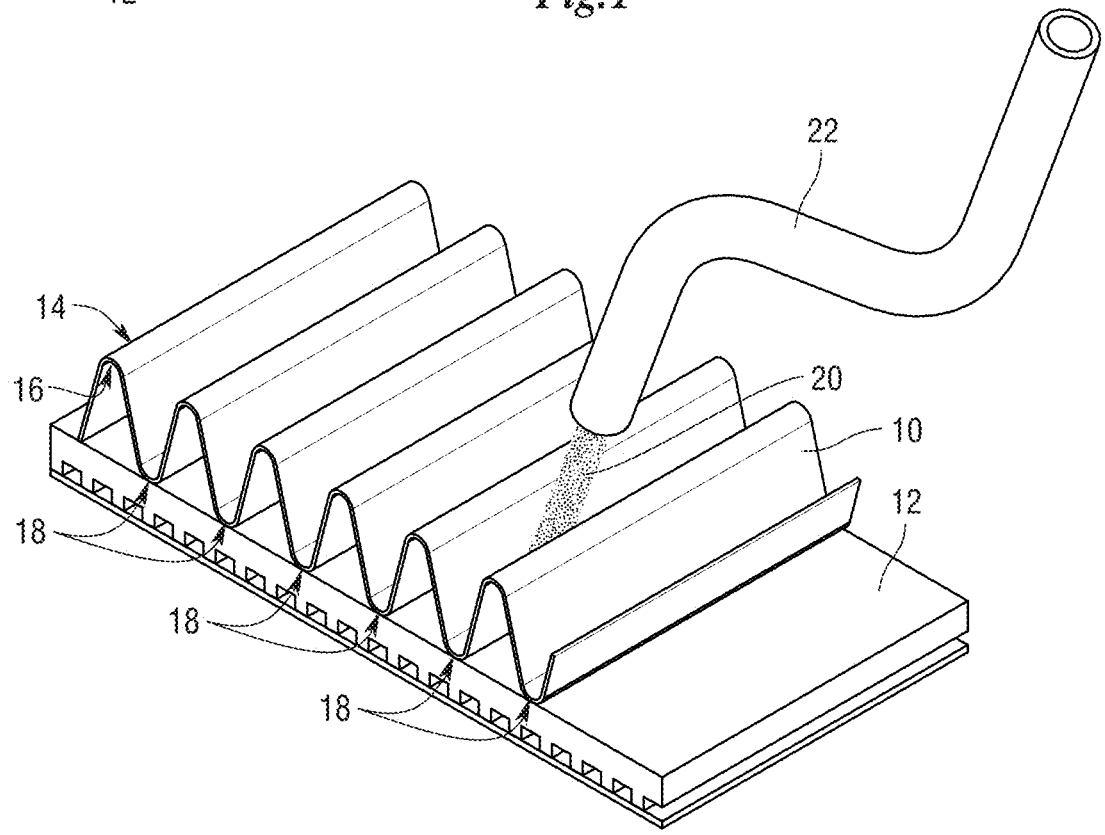
FIG. 2 is a perspective view of the representation of FIG. 1.

FIGS. 1 and 2 illustrates the method of attaching a first metal object 10, in this example the copper waveform, to a second metal object 12, in this example the stainless-steel under laminate. The first metal object 10 and the second metal 12 object are dissimilar materials—stainless-steel and copper, respectively. The first metal object 10 comprises an upper surface 14 and a lower surface 16. The first metal object 10 is first positioned in intimate contact with the second metal object 12 such that the second metal object 12 is in contact with the lower surface 16 of the first metal object. Essentially, the copper waveform 10 is placed on top of the stainless-steel under laminate 12.

Next, at least one attachment location 18 on the upper surface 14 of the first metal object 10 is identified. This would be a location where the first metal object 10 is in intimate contact with the second metal object 14. In the example of FIGS. 1 and 2, this would be in the troughs of the copper waveform 10 as these would be the locations that would be resting on the stainless-steel under laminate 12.

As shown in FIG. 1, a powdered metal 20 would then be added from a powder delivery nozzle 22 that is supplied by a reservoir (not shown). The powder delivery nozzle 22 directs the deposition of the powdered metal 20 on the upper surface 14 of the first metal object 10 at the at least one attachment location 18. A heat source, indicated by the arrow 24, is then fired at the powdered metal 20 to melt the powdered metal 20 and drive the melted powdered metal 20 through the first metal object 10 and into the second metal object 12.

As shown in FIG. 1, the stream of powdered metal 20 is delivered into the precise attachment location 18 requiring the fusion weld joint: the tangency of the copper wave form 10 and the stainless-steel under laminate 12. This stream of powdered metal 20 is synchronized with the firing of the laser 24 at predetermined intervals and with highly controlled and fixed parameters. When the laser 24 is fired, the laser's energy melts a precise amount of the powdered metal 20 at the attachment location 18 thus forming a fusion weld of the bimetallic sandwich. The powdered metal 20 helps to overcome the highly reflective and conductive properties of the incident copper waveform 10 allowing for a consistent and strong fusion weld to be produced. The powdered metal 20 also helps to bridge gaps that might exist at the tangency of the copper waveform 10 and the stainless-steel under laminate 12 further helping to produce a strong weld. The powdered metal 20 makes this a forging weld joint that is stronger than if the parts were welded autogeneously i.e. without filler material.

The laser melt pool is the area or zone where the laser 24 contacts the powdered metal 20 on the copper waveform 10 at the attachment location 18. A predetermined amount of powdered metal 20 is metered out as part of a controlled weld schedule via a feed wheel (not shown) by an inert carrier gas to the powder delivery nozzle 22. The powder delivery nozzle 22 directs the powdered metal 20 stream precisely into the melt pool of the laser 24. The injected powdered metal 20 stream absorbs the laser's energy and transfers enough energy into the copper waveform 10 to locally melt the copper waveform 10 allowing the joining/welding of the bimetallic heat exchanger to the stainless-steel under laminate 12. The powdered metal 20 thus overcomes the high reflectivity of the copper waveform 10. Having the powdered metal 20 in any other location, such as between the copper waveform 10 and the stainless-steel under laminate 12 would not be of any help as the laser 24 would have the high reflectivity and conduction of the copper waveform 10 to overcome.

The preferred powered metal 20 is a stainless-steel powder, but any metal or non-metal feed stock could be utilized in this joining process depending on the materials to be joined. Most laser filler metal welding is done with weld wire as the feed stock. For the heat exchanger application, fine filler wire was attempted to be used but it was found to be difficult to precisely and consistently align the wire into the laser melt pool. Often a cold joint was produced i.e. the part appeared to be welded from the surface, but proper weld fusion was absent at the interface of the tangency of the thin copper waveform and the stainless-steel under laminate. Heat exchangers of this type require a small precision fusion spot weld that happens in less than one second and it is very difficult to feed wire feed stock precisely and accurately in these short intervals. In contrast, the method presented herein uses powder metal 20 to form a uniform weld between the copper waveform 10 and the stainless steel under laminate 12. The blown powder techniques offer a very flexible and forgiving process as the alignment of powdered metal 20 is not as critical as the injection of wire. Fine small diameter filler wire needed for such a delicate weld would be very difficult to align and feed accurately for a high-volume production process.

The process has been proven to work in both the pulsed mode and continuous wave modes of laser welding with various wavelength lasers or other heat sources capable of producing a fusion weld. The preferred heat source is an IPG fiber laser that has a wavelength of 1-micron. The laser and can be run in either the pulsed single shot mode or continuous wave mode. Other laser types or heat sources could be used in this process. The power setting of the laser is determined by the weld application required. All the parameters are critical and controlled by fixed weld schedules. The set combination of the metered powdered metal 20 feed rate and the heat source 24 power are critical. The combination of parameters would have to be adjusted by the material type of the first metal object 10, the second metal object 12, and the particle size of the powdered metal 20.

If the CW continuous mode of laser 24 operation is used, the laser 24 is interfaced with a robot that provides motion control around the part allowing access to various locations across the entire part to be welded. The method would work with other system interfaces like the CNC or manual modes of operation. Other heat sources that could be used include a resistance welder, a tungsten inert gas welder, a metal inert gas welder, an ultrasonic welder, a friction welder, and an X-ray welder, etc. A camera or temperature sensor could also be incorporated into the method to monitor any of temperature, weld penetration, and failure conditions. This would further increase the reliability of the method.

As shown in FIGS. 1 and 2, the powdered metal 20 stream is delivered into the laser melt pool in the attachment location 18 off axis relative to the laser 24. The delivery nozzle 22 is located off the side i.e. off the axis of the delivered laser 24 beam that is coming vertically down. The copper waveform 10 geometry dictates that the powdered metal 20 stream be delivered off axis because of clear access to the tangency of the waveform. Other methods of delivery are coaxial where the powder stream is coincidental with the laser beam which would apply in applications where there is no wave form to interfere with the deposition of the powdered metal 20 relative to the laser 24. In other variations, the heat source 24 could comprise a dual spot weld with two laser beams slightly offset from each other fired either simultaneously or at different time intervals. The heat source 24 could also comprise a laser scanner or wobble head to stir the melted powdered metal 20 at the attachment location 18.

Figure 3:
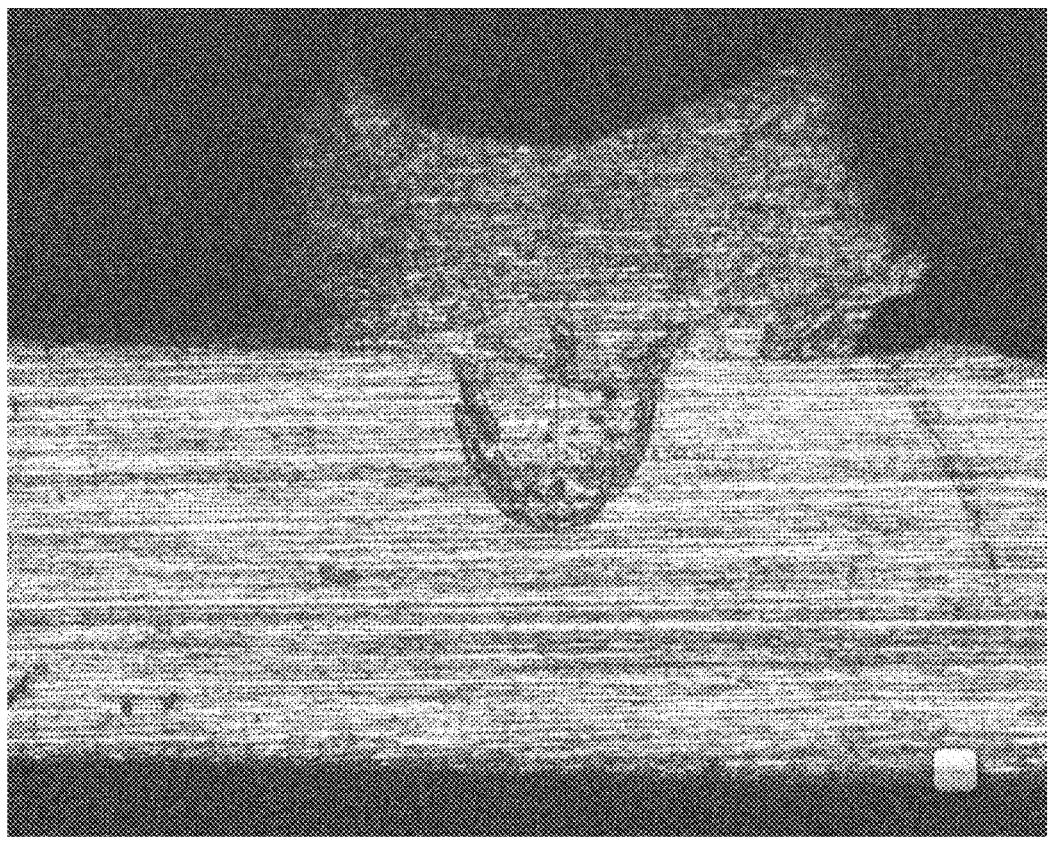
FIG. 3 is a photo micrograph of a laser weld of a copper waveform welded into a stainless-steel under laminate sheet.

Results achieved utilizing the process was shown in the fabrication of dozens of full-size functional parts that were destructively and metallurgically evaluated. The bimetallic joining process and technique produces consistent and reliable results in a production mode of operation on full size functional assemblies. Thousands of metallurgically acceptable fusion welds have been produced with this process. FIG. 3 shows a photo micrograph of a cross section of a laser weld of a copper waveform welded to a stainless-steel under laminate. The photograph shows the powdered metal fused by the laser after it has driven the copper waveform through the stainless-steel under laminate.

The method allows the welding of a bimetallic heat exchanger that has integral cooling channels slightly below the surface that cannot be breached by the welding process. Any breach of this cooling circuit at any of the hundreds of welding points is catastrophic to the function of the heat exchanger. Repairing of any weld breaches or leaks is generally not allowed as the customer will typically not allow repaired panels to be used in a production unit. Furthermore, access to the fully assembled heat exchanger stacks is difficult. If there is damage uncovered after the panels are assembled, this expensive and complex part would be scrapped. The presented method allows for the consistent joining of this bimetallic structure and the injection of the powdered metal material makes it very difficult to impossible to breach this cooling circuit.

Fixed parameters can be established for specific applications so that certified weld schedules can be established. So, if the powdered metal 20 filler is not properly located at the attachment location 18 or is not flowing at all, then no welds would be produced and there would be no joining of the materials. Such tight weld schedules control the laser's input power so that it is not capable of overcoming the high reflectivity of the copper waveform 10 to produce a fusion weld without the powdered metal 20 filler being present and properly located coincidental with the laser 24. The injected powdered metal 20 filler flow rate is controlled and maintained at a level that it can absorb the generated laser energy to produce a fusion weld joint.

The ability to create tight weld schedules allows the joining process presented to be fully automated to produce a strong and reliable weld joints between copper waveforms 10 and stainless-steel under laminates 12. The copper waveforms 10 could require hundreds of strong laser tack welds for each panel or subassembly which translates to thousands of welds on a fully assembled heat exchanger. The ability to automate this process offers a substantial cost savings. A fully automated process would greatly reduce the manual labor cost of the manufacturing of copper waveform heat exchangers. The process also reduces the need for costly reworks or issues caused by heat exchanger leaks.

Prior art solutions have been unable to produce a strong and reliable weld joints in such bimetallic wave form heat exchanger. Welds have failed on previously fabricated structures in the field causing costly downtime and catastrophic system failures. Weld failures in the field are not acceptable and can cause costly shutdowns of power substations in which these industrial heat exchangers are installed. Weld repairs of assembled wave form panels are economically undesirable and are highly detrimental to the marketing and growth of industrial heat exchangers. Prior art processes are unable to produce a strong and reproducible fusion joint at the interface of the two sheets. These are highly critical to the success of the end product and its ability to operate for years in the field.

This invention has been described with reference to several preferred embodiments. Many modifications and alterations will occur to others upon reading and understanding the preceding specification. It is intended that the invention be construed as including all such alterations and modifications in so far as they come within the scope of the appended claims or the equivalents of these claims.

The invention claimed is:

1. A method of attaching a first metal object to a second metal object, wherein the first metal object and the second metal object are dissimilar materials and the first metal object is a waveform comprising an upper surface and a lower surface, the method comprising:
positioning the first metal object in intimate contact with the second metal object such that the second metal object is in contact with the lower surface of the first metal object, wherein the second metal object is a sheet;
identifying at least one attachment location on the upper surface of the waveform where the waveform is in intimate contact with sheet;
depositing a powdered metal on the upper surface in a valley of the waveform at the at least one attachment location; and
firing a heat source at the deposited powdered metal to melt the powdered metal and drive the melted powdered metal through the first metal object and into the second metal object.

2. The method of claim 1 in which the first metal object has a higher reflectivity than the second metal object.

3. The method of claim 1 in which the material of the first metal object is copper.

4. The method of claim 1 in which the material of the second metal object is stainless steel.

5. The method of claim 1 in which the powdered metal is stainless steel.

6. The method of claim 1 in which the heat source is interfaced with a robot that provides motion control of a laser.

7. The method of claim 1 in which the heat source is any one of a laser welder operated in pulse mode, a laser welder operated in continuous wave mode, a resistance welder, a tungsten inert gas welder, a metal inert gas welder, an ultrasonic welder, a friction welder, and an X-ray welder.

8. The method of claim 1 in which the powdered metal is delivered off axis relative to the heat source.

9. The method of claim 1 in which the powdered metal is delivered coaxially relative to the heat source.

10. The method of claim 1 further comprising incorporating a camera or temperature sensor to monitor any of temperature, weld penetration, and failure conditions.

11. The method of claim 1 in which the heat source comprises a dual spot weld with two laser beams slightly offset from each other fired either simultaneously or at different time intervals.

12. The method of claim 1 in which the heat source comprises a laser scanner or wobble head to stir the melted powdered metal.

13. The method of claim 1 in which the powdered metal and the second metal object are the same type of metal.

\* \* \* \* \*